United States Patent
Gomes et al.

(10) Patent No.: US 8,507,738 B2
(45) Date of Patent: Aug. 13, 2013

(54) PROCESS FOR HYDROTREATING BIOMASS OIL DILUTED IN A REFINERY STREAM OF PETROLEUM HYDROCARBONS

(75) Inventors: Jefferson Roberto Gomes, Rio de Janeiro (BR); José Luiz Zotin, Rio de Janeiro (BR); Marcelo Edral Pacheco, Rio de Janeiro (BR); Raissa Maria Cotta Ferreira Da Silva, Rio de Janeiro (BR)

(73) Assignee: Petroleo Brasileiro S.A. - Petrobras, Rio de Janeiro (BR)

( * ) Notice: Subject to any disclaimer, the term of this patent is extended or adjusted under 35 U.S.C. 154(b) by 763 days.

(21) Appl. No.: 12/768,327

(22) Filed: Apr. 27, 2010

(65) Prior Publication Data
US 2010/0270207 A1    Oct. 28, 2010

(30) Foreign Application Priority Data
Apr. 27, 2009   (BR) .................................... 0900789

(51) Int. Cl.
C07C 1/00    (2006.01)
C07C 4/00    (2006.01)

(52) U.S. Cl.
USPC ........ 585/240; 208/142; 208/216 PP; 208/46; 585/733; 44/605; 44/601

(58) Field of Classification Search
USPC ............. 585/240, 733; 208/46, 142, 216 PP; 44/601, 605
See application file for complete search history.

(56) References Cited

U.S. PATENT DOCUMENTS

| | | | | |
|---|---|---|---|---|
| 4,420,388 A | * | 12/1983 | Bertolacini et al. | 208/112 |
| 4,992,605 A | * | 2/1991 | Craig et al. | 585/240 |
| 5,705,722 A | * | 1/1998 | Monnier et al. | 585/240 |
| 7,550,634 B2 | * | 6/2009 | Yao et al. | 585/240 |
| 8,193,399 B2 | * | 6/2012 | Gosling | 585/14 |
| 8,288,599 B2 | * | 10/2012 | Yanik et al. | 585/240 |
| 2006/0161032 A1 | * | 7/2006 | Murzin et al. | 585/240 |
| 2006/0186020 A1 | * | 8/2006 | Gomes | 208/46 |
| 2008/0161614 A1 | | 7/2008 | Bertoncini et al. | |

FOREIGN PATENT DOCUMENTS
EP    1 693 432 A1    8/2006

* cited by examiner

Primary Examiner — Nina Bhat
(74) Attorney, Agent, or Firm — Sughrue Mion, PLLC

(57) ABSTRACT

A co-processing combining a first selective catalytic bed consisting of only one metal element selected from group VIB metals and of at least one conventional hydrotreating bimetallic catalytic bed. The co-processing provides control of the hydroconversion reactions of the triglycerides and/or fatty acids of biomass oil diluted in a refinery stream of petroleum hydrocarbons and minimizes the generation of gaseous products that are undesirable to the process, while maintaining the levels of unsaturated hydrocarbons hydrogenation and of heteroatomic contaminants removal from the refinery stream of petroleum hydrocarbons. The co-processing selectively providing n-paraffins of even number of carbon atoms, generated from the biomass oil, which are incorporated in a hydrotreated liquid product in petroleum refining HDT units.

20 Claims, No Drawings

PROCESS FOR HYDROTREATING BIOMASS OIL DILUTED IN A REFINERY STREAM OF PETROLEUM HYDROCARBONS

RELATED APPLICATIONS

The present application claims priority to Brazilian Application PI0900789-0, filed on Apr. 27, 2009, which is hereby incorporated by reference in its entirety.

BACKGROUND OF THE INVENTION

1. Field of the Invention

The present application falls within the field of production of hydrotreated liquid fuel in petroleum refining by co-processing biomass oil containing triglycerides and/or fatty acids diluted in a refinery stream of petroleum hydrocarbons for catalytic hydrotreating—HDT units. More specifically, a liquid feedstock is introduced into a first catalytic bed containing only one metal selected from group VIB and flows through at least one bimetallic HDT catalytic bed, with control of the biomass oil hydroconversion reactions, minimizing the generation of the gaseous products CO, $CO_2$ and $CH_4$, while maintaining the levels of hydrogenation of unsaturated hydrocarbons and of removal of the heteroatomic contaminants in comparison to the hydrotreating of the refinery stream thereof.

2. Description of the Related Art

The processing of biomass in order to obtain renewable fossil fuels is of major interest and makes a contribution towards protection of the environment.

Biomass usually yields oils rich in triglycerides, which are widely used in industry, referred to as biomass oils, including vegetable oils and animal fat lipids which provide fatty acids by various reaction mechanisms.

Natural oils and fats are comprised predominantly or substantially of triglycerides of fatty acid carbon chain having an even number of carbon atoms, saturated or unsaturated. In oils, fatty acid glycerides with unsaturated carbon chains and, in fats, saturated fatty acids glycerides predominate.

Some biomass oils are used directly as fuels or processed into biodiesel of fatty acid esters. Also, they are co-processed in petroleum refining units to produce fuels with a contribution of hydrocarbons generated from renewable sources.

Thus, the co-processing of biomass oils in petroleum refining is aimed at the conversion of triglycerides into hydrocarbons, making it possible to advantageously use an established refinery scheme with minor modifications and with a potential benefit in terms of the cost of production and distribution of bioproducts on a small scale. However, there are economic barriers in terms of the costs of production of such products in petroleum refinery co-processing, as well as technological barriers such as: the limit to the volume of biomass oil admissible in co-processing, the consumption of hydrogen for triglyceride hydroconversion reactions, and the fatty acids decarboxylation/decarbonylation reactions with the generation of undesirable gaseous products CO and $CO_2$.

For example, the purpose of a catalytic hydrotreating unit ("HDT") is to hydrogenate refinery streams of petroleum hydrocarbons in order to remove contaminants such as nitrogen, sulphur, oxygen and metals, and to hydrogenate unsaturated hydrocarbons. In this case the product distillation range is essentially the same as the feedstock submitted to the process, though lighter secondary products may be produced through hydrocarbon hydrocracking reactions. In particular, a conventional HDT unit aims not only to improve the quality of refinery streams but also to specify finished products such as kerosene, diesel oil and fuel oils; the processing conditions differ under the feedstock and the catalyst characteristics.

Generally speaking, a conventional HDT process comprises the flow of petroleum hydrocarbons mixed with a hydrogen stream through a fixed catalytic bed reactor, under pressure of between 1 and 15 MPa, and an average temperature of between 280° C. and 400° C. Since exothermic reactions are involved and the reactor operating under adiabatic condition it is necessary to increase the temperature throughout the fixed catalytic bed. However, the process imposes limits on the increase in temperature, normally 40° C. per catalytic bed, in order to minimize the deactivation of the catalyst and to guarantee a minimum catalyst lifetime of 1 to 2 years. When the reaction heat is very high and the increase in temperature is excessive, the reactor can have more than one fixed catalytic bed and a recycled gas stream can be injected for quenching and also for hydrogen make-up. In the case of more than one catalytic bed, the thermal release is greater in the first bed, due to the presence of more reactive components and the greater concentration of reagents, and as a result the reaction rate is higher; thus, the more refractory reagents continue reacting at a lower reaction rate through the subsequent catalytic beds in the reactor.

Therefore, a major factor in conventional petroleum refinery hydrotreating processing units, which makes the co-processing of biomass oil difficult, is the high exothermal hydroconversion reactions of the trygliceride and the generation of $H_2O$, CO and $CO_2$ gases due to decarboxylation/decarbonisation reactions of fatty acids.

In a fixed catalytic bed HDT reactor, bimetallic catalysts are generally charged as metal oxides (such as, Ni—Mo, Co—Mo, Ni—W and Ni—W), supported by materials with a high specific area and high porosity, with the most widely used materials being $\gamma$-alumina ($\gamma$-$Al_2O_3$) with a specific area of between 200 and 400 $m^2$/g and a porous volume of between 0.5 and 1.0 $cm^3$/g. Besides providing a high specific area, in which the active components are dispersed in the form of small particles, the support provides mechanical resistance and thermal stability, preventing the sintering of the catalyst within the reactor.

Such catalysts are usually sulphided in order to obtain the most activity for the catalytic bed in the process. And, as there is a synergic effect between the metal sulphides from group VIB of the Periodic Table (Mo and W) and those from group VIII of the Periodic Table (Co and Ni), the activity of a catalyst containing both is much greater than the activity of each one alone.

In summary, the co-processing of triglycerides in petroleum refinery catalytic hydrotreating units is dependent upon the characteristics of the catalysts used, the hydroconversion reactions and the molecular structure of the feedstock components.

In biomass oils catalytic processing, under hydroconversion conditions, hydrogenation of double bonds occurs, initially, followed by thermal cracking reactions of the saturated long chains of carbon atoms. In that, acrolein and carboxylic acids are generated wherein: carboxylic acids molecules can react through the decarboxylation mechanism resulting in $CO_2$, or by decarbonylation, with the production of CO and $H_2O$, or by the dehydration mechanism producing corresponding n-paraffins and $H_2O$; acrolein molecules can react in the presence of the catalyst generating C3; and the CO can react with hydrogen generating $CH_4$ and $H_2O$.

As shown in PI 0500591-4, which is hereby incorporated by reference in its entirety, the hydroconversion of triglyceride-rich oils in a mixture with petroleum hydrocarbons, when co-processed in an HDT unit, results in an advantageous alternative which adds to the quality of the diesel oil produced. However, the generation of gaseous products (CO, $CO_2$ and $CH_4$) may limit refinery co-processing in fixed catalytic bed reactors charged with bimetallic catalysts, in the form of supported group VIB metal oxides, promoted by metals from group VIII, and sulphided.

A similar outcome is clear from patent document U.S. application Ser. No. 11/342,888, which is hereby incorporated by reference in its entirety, for the production of hydrocarbons with a boiling point in diesel range, such as by co-processing vegetable oils with LCO under hydrotreatment conditions in a catalytic fixed or fluid bed reactor.

Therefore, it is known that an increase in the concentration of gases (CO, $CO_2$ and $CH_4$) in the reaction medium decreases the catalytic activity in terms of contaminants removal and the hydrogenation of unsaturated hydrocarbons in refinery streams in order to obtain a hydrotreated liquid product. The main reason for the catalytic activity decrease in the reaction zone is due to a reduction in $H_2$ partial pressure which takes place when there are increases in $CH_4$ in the gas recycle.

U.S. application Ser. No. 11/962,760, which is hereby incorporated by reference in its entirety, teaches a solution for the problem of reduction in $H_2$ partial pressure in an HDT process with the use of two reactors in series and intermediate separation of the gaseous products (CO, $CO_2$, $H_2O$, $H_2S$ and $NH_3$) generated in the first reactor. This process uses a feedstock consisting of the mixture of an oil of animal or vegetable origin and petroleum hydrocarbons in order to produce a fuel containing less than 50 mg/kg of sulphur.

It is clear, therefore, that alternatives must be sought for the co-processing biomass oils with refinery streams of petroleum hydrocarbons in order to obtain finished products with a higher added value, such as: kerosene, diesel or fuel oil.

In the following, a process is described for hydrotreating biomass oils diluted in a refinery stream of petroleum hydrocarbons, offering advantages in conversion and selectivity for the production of fuels using HDT petroleum refinery units, combining the control of the triglycerides hydroconversion reactions with that of the hydrogenation reactions of the unsaturated hydrocarbons and the removal of heteroatomic contaminants from the refinery petroleum hydrocarbon stream.

SUMMARY OF THE INVENTION

Exemplary embodiments of the present invention address the above disadvantages and other disadvantages not described above.

The process itself refers to co-processing biomass oil diluted in a refinery stream of petroleum hydrocarbons, with low generation of CO, $CO_2$ and $CH_4$ gases, adding value to the hydrotreated liquid product by incorporating n-paraffins in the range C12-C18 generated from triglycerides in the biomass oil.

The process provides a solution to the problem of generation of gases from the hydroconversion of triglycerides into n-paraffins, in co-processing of a biomass oil diluted in a usual refinery stream of petroleum hydrocarbons in a hydrotreating—HDT unit in petroleum refining.

The invention provides a process for hydrotreating a biomass oil diluted in a refinery stream of petroleum hydrocarbons, which process involves the use of sulphided catalytic beds consisting of (i) a first catalytic bed containing only one group VIB metal oxide and (ii) one or more second bimetallic catalytic beds for hydrotreating the refinery stream, wherein the process comprises the steps of:

a) diluting a volume of biomass oil comprising more than 70% wt of one or more triglycerides and/or one or more fatty acids in a refinery stream of petroleum hydrocarbons, preferably a refinery stream of petroleum hydrocarbons with a distillation range between 140 and 500° C., to obtain a feedstock containing between 1 and 75% wt of the biomass oil, preferably wherein said one or more triglycerides have ester groups derived from fatty acids having a C12-C18 carbon chain and/or said one or more fatty acids have a C12-C18 carbon chain;

b) mixing a hydrogen stream with the feedstock to obtain a first reaction mixture, which is heated and injected in the first catalytic bed at a temperature of between 220 and 370° C., preferably between 220 and 350° C., causing it to react under a pressure of between 3 and 15 MPa;

c) injecting upstream of a second catalytic bed a dilution stream comprising hydrogen to obtain a second reaction mixture, which is hydrotreated under conditions for hydrotreating petroleum hydrocarbons, such that gaseous products and a stream of liquid hydrocarbons are obtained; and d) separating the gaseous products, recovering a stream of liquid hydrocarbons containing dissolved gases, purifying the stream to remove dissolved gases to obtain a hydrotreated liquid product.

The invention further provides a process for hydrotreating biomass oil diluted in a refinery stream of petroleum hydrocarbons with a distillation range between 140 and 500° C., with the biomass oil predominantly consisting of triglycerides and/or fatty acids with carbon chains C12-C18, characterised in that it comprises sulphided catalytic beds, consisting of a first catalytic bed containing only one VIB metal oxide and of at least one second bimetallic catalytic bed for hydrotreating the refinery stream, configuring a first reaction zone for hydroconversion of the triglycerides and/or fatty acids into corresponding n-paraffins C12-C18, the process involving the following steps:

a) diluting a volume of biomass oil, containing more than 70% wt of triglycerides and/or fatty acids, in a refinery stream of petroleum hydrocarbons, to obtain a feedstock containing between 1 and 75% wt of the biomass oil;

b) mixing a hydrogen stream with the feedstock, to obtain a first reaction mixture which is heated and injected in the first catalytic bed at a temperature of between 220 and 350° C., causing it to react under a pressure of between 3 and 15 MPa;

c) injecting a dilution stream, with a make-up hydrogen, upstream of a second catalytic bed, generating a second reaction mixture, under hydrotreating conditions for the petroleum hydrocarbons, to obtain gaseous products and a stream of liquid hydrocarbons; and d) separating the gaseous products, recovering the liquid hydrocarbons generated in a stream that is rectified with the removal of dissolved gases, obtaining of a hydrotreated liquid product.

The process of the invention provides an increase in overall production of HDT units already installed in a petroleum refinery since a biomass oil can be diluted in the usual petroleum hydrocarbons feedstock in proportions of between 1 and 75% wt and produce n-paraffins in the range C12-C18.

The reactions take place in a first, sulphided fixed catalytic bed, containing only one metal oxide from group VIB, preferably W or Mo, for selective hydroconversion of triglycerides into n-paraffins, followed by at least one usual fixed sulphided bimetallic catalytic bed, containing group VIB and VIII metal oxides for hydrotreating the refinery stream of petroleum hydrocarbons.

The first catalytic bed promotes the hydroconversion of the triglycerides, in a first reaction zone, with low generation of CO and $CO_2$ gases and high generation of n-paraffins of even number of carbon atoms. And, after the first catalytic bed, the reaction mixture passes through at least one subsequent bed to promote the other hydroconversion reactions.

The products of hydroconversion reactions are obtained and separated into: gaseous products and a stream of liquid products containing dissolved gases. This liquid stream is rectified/purified to recover a hydrotreated liquid product, with greater yield and added value by incorporating n-paraffins C12-C18 from biomass oil.

Therefore, the co-processing of biomass oil diluted in a refinery stream of petroleum hydrocarbons is feasible, keeping the integrity of the fixed catalytic bed of a refinery hydrotreating HDT unit and increasing the yield of hydrotreated liquid product, by selective hydroconversion of triglycerides into n-paraffins having even number of carbon atoms while the levels of hydrogenation of unsaturated hydrocarbons and removal of heteroatomic contaminants from the refinery stream of petroleum hydrocarbons are maintained.

DETAILED DESCRIPTION OF THE INVENTION

It is to be understood that both the foregoing general description and the following detailed description are exemplary and are intended to provide further explanation of the invention claimed.

In a usual refining hydrotreating unit—HDT unit, the co-processing taught herein of biomass oil diluted in a stream of refinery petroleum hydrocarbons is an alternative that adds quality to the hydrotreated liquid product, by means of controlling the hydroconversion reactions of the triglycerides from the biomass oil while maintaining integrity of the catalytic bed.

Broadly, the co-processing provides advantages to the conversion into a hydrotreated liquid product, by selectively producing n-paraffins C12-C18 with even number of carbon atoms, when the feedstock undergoes hydroconversion in a sulphided metal oxide catalytic bed, combining a first selective monometallic catalytic bed for hydroconversion of triglycerides into n-paraffins and at least one bimetallic catalytic bed for hydrotreating petroleum hydrocarbons streams.

The HDT co-processing is based on the hydroconversion reactions and the molecular structure of feedstock components, as well as on the characteristics of the catalyst used.

The hydroconversion reactions take place in the first catalytic bed containing only metal oxides of one element selected from group VIB, preferably W or Mo, sulphided, with increased selectivity for hydroconversion into n-paraffins C12-C18 from the biomass oil, and at least one second conventional bimetallic catalytic bed for hydrotreating the refinery stream of petroleum hydrocarbons, configuring a first reaction zone for hydroconversion of the triglycerides and/or fatty acids and second reaction zones for hydrogenation of unsaturated hydrocarbons and removal of heteroatomic contaminants from the refinery stream of petroleum hydrocarbons.

Thus, the triglyceride hydroconversion reactions are selectively controlled, minimising the generation of gases ($H_2O$, $CO_2$, CO and $CH_4$) and increasing the conversion into n-paraffins C12-C18, while the levels of hydrogenation of unsaturated hydrocarbons and of heteroatomic contaminants removal from the refinery stream of petroleum hydrocarbons are maintained, as shown in EXAMPLE 4.

For the co-processing, the useful refinery streams might have distillation boiling range between 140 and 500° C., preferably in diesel oil range (190-480° C.) or in a kerosene range (150-330° C.). The biomass oils are preferably selected from vegetable oils, algae oil, lipids of animal origin, or a mixture thereof in any proportions, provided that it contains triglycerides and/or fatty acids (C12-C18) in concentrations of more than 70% wt.

These vegetable oils may be selected from soya oil (*Glycine max*), castor oil (*Ricinus communis*), cottonseed oil (*Gossypium hirsutum* or *G. Barbadenseis*), Brazilian palm tree oil (*Elaies guinensis*), pine oil (Tall oil), sunflower oil (*Helianthus annuus*), Barbados nut oil (*Jatropha curcas*), palm oil (*Elais guinenis*), coconut oil (*Cocus nucifera*), rapeseed oil (*Brassica napus*), peanut oil (*Arachis hypogea*) or a mixture thereof in any proportions.

Biomass oils having predominantly saturated carbon chains (for example, palm tree oil and lipid of animal origin) need less hydrogen for the hydroconversion and as such they are preferably selected for the co-processing feedstock.

For the first catalytic bed containing only one group VIB metal element, the metal oxide must be dispersed in a proportion of between 1 and 25% by mass in relation to a support consisting of material of meso and macro porosity selected from alumina, silica, silica/alumina, magnesium oxide, and carbon and also other materials with a high surface area, which allow high metal dispersions to be achieved in a fixed catalytic bed being sulphided in order to obtain its highest activity for the reaction. The first catalytic bed does not contain a VIII metal.

Following the first selective catalytic bed, at least a second catalytic bed selected from among the conventional HDT bimetallic catalysts is used for promoting the hydrogenation reactions of unsaturated hydrocarbons and removal of heteroatomic contaminants such as sulphur from the refinery stream. The conventional HDT catalysts are preferably commercial catalysts of group VIB metal oxides, promoted by metals from group VIII, in a concentration of between 1 and 15% wt of Ni or Co, preferably between 1 and 7% wt, and dispersed on supports with a high surface area. These catalysts are market in metal oxide form (Ni—Mo, Co—Mo, Ni—W and Co—W) in concentrations of between 1 and 25% wt, preferably between 12 and 20% wt in relation to a support consisting of material of meso and macro porosity selected from alumina, silica, silica/alumina, magnesium oxide, and carbon and also any other materials with a high surface area, which allow high dispersion of the metal phase.

The catalysts can be charged in sulphided form or in the form of metal oxides which are then sulphided within the reactor by a specific process, consisting of a combined catalytic bed which promotes the hydroconversion reactions of the feedstock with a stream of hydrogen whose concentration is more than 90% by volume, within a reactor at an overall spatial velocity Vs of between 0.2 and 12 $h^{-1}$, preferably of between 0.8 and 4 $h^{-1}$.

A catalytic bed configured in that way can be prepared in a pre-existing HDT unit, by replacing just a first bed of the reactor or by adding a pre-reactor, in order to carry out a process involving the following steps:

(a) Diluting a volume of biomass oil, containing more than 70% wt of triglycerides and/or fatty acids, in a refinery stream of petroleum hydrocarbons, to obtain a feedstock containing between 1 and 75% wt of the biomass oil;

(b) Mixing a hydrogen stream with the feedstock, to obtain a first reaction mixture which is heated and injected in the first catalytic bed at a temperature of between 220 and 350° C., causing it to react under a pressure of between 3 and 15 MPa;

(c) Injecting a dilution stream, with a make-up hydrogen, upstream of a second catalytic bed, generating a second reaction mixture, under hydrotreating conditions for the petroleum hydrocarbons, to obtain gaseous products and a stream of liquid hydrocarbons;

(d) Separating the gaseous products, recovering the liquid hydrocarbons generated in a stream that is rectified with the removal of dissolved gases, and obtaining a hydrotreated liquid product containing n-paraffins from the hydroconversion of the biomass oil.

Depending on the distillation range of the feedstock components, the first reaction mixture must be heated to the entry temperature of the first reaction zone, preferably at between 280 and 330° C. and at between 3 and 12 MPa.

The hydroconversion reactions of triglycerides predominantly remove oxygen atoms and unsaturates of hydrocarbon chains, generating a stream consisting of C3, $H_2O$ and n-paraffins C12-C18. As shown by EXAMPLE 1, the selective monometallic catalytic bed, containing only metals from group VIB, promotes the hydroconversion reaction predominantly of triglycerides into n-paraffins with even number of carbon atoms and the process results in higher yields of liquid products in relation to the triglyceride amount in the feedstock when compared with co-processing using only a conventional HDT bimetallic catalytic bed.

Advantageously, the first selective catalytic bed promotes the hydroconversion of triglycerides with low generation of the gases CO, $CO_2$ which would later be hydrogenated generating $CH_4$.

Therefore, a solution is provided to the problem of generation of undesired gases from the reactions in the hydroconversion of triglycerides into n-paraffins, in an HDT reactor which operates the co-processing of biomass oils diluted in a refinery stream of petroleum hydrocarbons.

In addition, the co-process provides a hydrotreated liquid product, with improved quality when compared with those of the product of hydrotreating the refinery stream of petroleum hydrocarbons thereof, as shown in Table 5 of EXAMPLE 4. Thus, the hydrotreated liquid produced by the co-processing can be mixed with other less noble streams in the petroleum refining, thereby contributing to a reduction in the environmental impact of non-renewable fossil products.

Also, the refinery stream of petroleum hydrocarbons contributes to minimise the temperature increase rate due to triglyceride hydroconversion reactions throughout the catalytic bed, thereby maintaining the integrity and the lifetime of the HDT catalyst, although usual inorganic contaminants of biomass oils, such as Na, K, Ca and P, are contaminants for the catalysts.

It is known that the hydrotreated product obtained from co-processing can be recycled and dilute the biomass oil stream in the feedstock, as well as a stream of the gaseous products separated can be recycled for diluting and cooling a certain reaction zone. In the present co-processing, the stream of gaseous products is rich in hydrogen, due to the low generation of gases (CO, $CO_2$ and $CH_4$), and can be recycled to enter the reactor without the need of purification.

In the co-processing, the dilution stream can be adjusted independently, upstream of a catalytic bed, not only for quenching the reaction zone, but also to make-up the hydrogen for hydroconversion reactions.

Therefore, the co-processing adds value to the hydrotreated liquid product, maximising the generation of n-paraffins from renewable sources and, above all, makes the co-processing feasible by maintaining the integrity of the catalytic bed, in order to obtain hydrocarbons products from a biomass oils diluted in a refinery stream of petroleum hydrocarbons usually hydrotreated in a refining catalytic HDT unit.

EXAMPLES

The results of the co-processing advantages can be demonstrated by the examples presented below, but the invention is not limited thereto.

Comparative tests, whose results are set out in the following, were carried out in a prototype HDT unit in an isothermal reactor with equivalent performance to the industrial adiabatic reactor operating at the same weighted average temperature (WABT). The reactor was charged with commercial HDT catalysts, according to the characteristics shown in Table 1, on a $\gamma$-$Al_2O_3$ support, constituting a catalytic bed which was sulphided with a stream of hydrocarbons doped with $CS_2$.

TABLE 1

| | Catalyst | |
| --- | --- | --- |
| | NiMo | Mo |
| $MoO_3$, % m/m | 18 | 20 |
| NiO, % m/m | 6 | zero |
| Surface area, $m^2/g$ | 165 | 180 |

Example 1

This example illustrates the generation of n-paraffins, determined quantitatively by gas chromatography, in the outlet from the HDT reactor, charged with commercial catalysts from Table 1, in a single bimetallic bed of type NiMo, and with two subsequent beds (Mo+NiMo) having a distribution of 50% by volume, the first bed being charged with the selective monometallic catalyst Mo.

A soya oil stream was diluted in a proportion of 20% by mass with a diesel oil (density 0.8793 at 20/4° C.; distillation range 157-484° C.) and mixed with a gas stream under a hydrogen flow of 580 $Nm^3/m^3$ in relation to the feedstock in order to constitute a reaction mixture which was admitted to the test reactor and reacted under conditions of 350° C., 6 MPa and overall Vs of 2 $h^{-1}$, generating gaseous products and liquid hydrocarbons.

The results of hydrocarbons yields in the hydrotreated product were normalised in relation to the soya oil and are presented in Table 2, corresponding to the hydroconversion of biomass oil.

TABLE 2

| | Catalyst | |
| --- | --- | --- |
| | NiMo | (Mo + NiMo) |
| Gaseous products, % vol | 2.7 | 0.9 |
| Liquid products, % vol | 97.3 | 99.1 |
| n-Paraffins, % m/m | | |
| nC15 | 10 | 2 |
| nC16 | 5 | 12 |
| nC17 | 53 | 7 |
| nC18 | 33 | 79 |
| nC even/nC odd number | 0.6 | 10.1 |

It can be seen that the first catalytic bed responds with an increased selectivity of n-paraffins with an even number of carbon atoms (nC even) by a factor of more than 10, minimising the generation of gaseous products (CO, $CO_2$ and $CH_4$) from the hydroconversion reaction of biomass oil triglycerides. The carbon chains with even number of carbon atoms (nC even) of the n-paraffins correspond to the long chains of the carboxylic acids predominating in the biomass oil used.

Example 2

This example illustrates the effect of temperature and of pressure in the generation of gases (CO, $CO_2$ and $CH_4$) by decarboxylation/decarbonylation reactions of the fatty acids of biomass oil, in the two catalytic systems of the above example (NiMo) and (Mo+NiMo). The tests were carried out at an overall Vs of 1.6 $h^{-1}$ and the results shown in Table 3 correspond to the catalytic beds A (NiMo) and B (Mo +NiMo), consisting of commercial catalysts from Table 1 and to the processing of the same feedstock as for the previous example.

TABLE 3

|  | Test 1 | | Test 2 | | Test 3 | | Test 2a | |
| --- | --- | --- | --- | --- | --- | --- | --- | --- |
| Pressure, MPa | 6 | | 6 | | 6 | | 8 | |
| Temperature, °C. | 330 | | 350 | | 370 | | 350 | |
| Catalytic bed | A | B | A | B | A | B | A | B |
| Gaseous products | | | | | | | | |
| CO | 0.37 | 0.08 | 0.61 | 0.17 | 0.95 | 0.37 | 0.68 | 0.18 |
| $CO_2$ | 0.75 | zero | 0.81 | zero | 0.89 | 0.17 | 0.70 | zero |
| $CH_4$ | 0.84 | 0.07 | 0.57 | 0.08 | 0.76 | 0.21 | 0.48 | 0.17 |
| C3 | 1 | 1 | 1 | 1 | 1 | 1 | 1 | 1 |

The results correspond to the molar ratio between each component of the gaseous products (CO, $CO_2$ and $CH_4$) in the outlet from the HDT reactor, taking as reference the generation of C3 for each mol of triglyceride. The advantage of using the selective catalyst Mo in the first catalytic bed of the catalytic system B is clear—a major reduction in the generation of gaseous products (CO, $CO_2$ and $CH_4$) can be seen which consequently demonstrates the selectivity of the catalyst in the hydroconversion into n-paraffins with an even number of carbon atoms.

It can be seen that the increase in temperature (between 330 and 370° C.) in the reaction zone does not give rise to a loss of selectivity of the monometallic catalyst for the same feedstock. And, with regard to pressure, comparing the results of the process under equal temperature conditions (at 350° C.), it can be seen that there is an increase in the generation of $CH_4$ with no increase in the concentration of CO and $CO_2$ in the gaseous products generated in the reactor outlet, probably due to hydrocracking reactions.

Example 3

This example illustrates the selectivity of the process in relation to the chemical characteristics of the refinery stream of petroleum hydrocarbons which dilutes the soya oil in the feedstock, in the test reactor charged with 50% by volume of a first selective catalytic bed Mo and a second bimetallic catalytic bed NiMo defined in Table 1. The results are presented for the co-processing of a refinery stream D1, comprising 20% by volume of a diesel oil directly distilled from petroleum and a stream of D2 comprising 20% by volume a mixture of heavy diesel, coker gas oil and recycled gas oil, rich in nitrogen compounds and petroleum olefins.

Table 4 gives the yields of each component of the gaseous products obtained under the same process conditions, that is: temperature of 350° C., 6 MPa and Vs of 1.6 $h^{-1}$.

TABLE 4

|  | Feedstock | |
| --- | --- | --- |
| Gaseous products | Soya oil + D1 | Soya oil + D2 |
| CO | 0.17 | 0.13 |
| $CO_2$ | zero | zero |
| $CH_4$ | 0.08 | zero |
| C3 | 1.0 | 1.0 |

It can be seen that the generation of gaseous products (CO, $CO_2$ and $CH_4$) by the decarboxylation/decarbonylation reaction of fatty acids reduces when co-processing a charge rich in components that neutralise the acidity of the selective catalyst for the hydroconversion of triglycerides into n-paraffins with an even number of carbon atoms.

Therefore, the process makes feasible the hydrotreatment of biomass oil diluted in different refinery streams usually processed in a petroleum refinery, minimising the production of gases (CO, $CO_2$ and $CH_4$) by controlling the hydroconversion reactions of the triglycerides of the feedstock.

Example 4

This example illustrates the main characteristics of a hydrotreated liquid product obtained from the process with a diesel oil feedstock and a second feedstock comprising 19% wt of soya oil diluted in the diesel oil, under hydrotreating conditions, using the monometallic catalyst defined in Table 1 in the first catalytic bed in all the tests. Table 5 shows the test data and hydrotreated products analysis, where: Test F corresponds to the processing of a diesel oil feedstock, taken for comparison with the other Tests F1, F2 and F3 of the co-processing of the soya oil with the diesel oil.

TABLE 5

|  | Test F | Test F1 | Test F2 | Test F3 |
| --- | --- | --- | --- | --- |
| HDT conditions | | | | |
| Pressure, MPa | 6.1 | 6.1 | 6.1 | 6.1 |
| Temperature, ° C. | 330 | 329 | 350 | 370 |
| LHSV, $h^{-1}$ | 1.6 | 1.6 | 1.6 | 1.6 |
| $H_2$/Feedstock, $Nm^3/m^3$ | 589 | 580 | 583 | 568 |

TABLE 5-continued

|  | Test F | | Test F1 | Test F2 | Test F3 |
|---|---|---|---|---|---|
| Products/Properties | Diesel | F | F1 | F2 | F3 |
| Density @ 20/4° C. | 0.8793 | 0.8717 | 0.8574 | 0.8568 | 0.8561 |
| Distillation ASTM D-2887 | | | | | |
| PIE, ° C. | 157.2 | 186.8 | 189.2 | 178.6 | 178.4 |
| 2% | 195.4 | 210.8 | 213.9 | 207.8 | 207.1 |
| 10% | 249.4 | 252.6 | 256.0 | 254.1 | 253.6 |
| 50% | 324.4 | 325.6 | 320.8 | 320.4 | 320.2 |
| 90% | 415.8 | 415.0 | 409.4 | 412.3 | 411.0 |
| 98% | 457.2 | 455.6 | 456.5 | 463.1 | 461.1 |
| PFE | 484.3 | 482.9 | 485.9 | 495.5 | 492.4 |
| S, mg/kg | 3765 | 477 | 540 | 222 | 216 |
| N, mg/kg | 803 | 515 | 430 | 264 | 184 |
| DCN | 47.34 | 50.90 | 59.86 | 58.78 | 57.85 |
| Viscosity, mm$^2$/s | | | | | |
| 20° C. | 14.51 | 15.02 | 12.00 | 11.97 | 11.60 |
| 40° C. | 7.238 | 7.480 | 6.335 | 6.339 | 6.181 |
| 50° C. | 5.482 | 5.660 | 4.898 | 4.899 | 4.793 |

Based on the results for the properties of products F and F1, obtained under hydrotreating conditions in the test reactor, it is possible to see advantages in the quality of DCN ignition and a reduction in the density and the viscosity of the hydrotreated product obtained in the co-processing, while the level of removal of heteroatomic contaminants (S and N) of the petroleum hydrocarbons of the stream of (diesel) are maintained. Comparatively, the distillation curves for F and F1 are similar, with the final boiling point (FBP) being maintained, indicating that the biomass oil was fully converted into the hydrotreated product F1.

It is also possible to see that the removal of heteroatomic contaminants can be maximised by varying the hydrotreatment temperature conditions, leading to a small change in the distillation curve and in the viscosity of the products, as illustrated by the results of Tests F2 and F3.

Therefore, not only does the co-processing of biomass oil diluted in a stream of refinery petroleum hydrocarbons, in an HDT unit, with a first selective monometallic catalyst consisting only of one group VIB metal followed by at least one conventional HDT bimetallic catalyst increase the yield of hydrotreated liquid product, it also adds value by the incorporation of n-paraffins from a biomass oil hydroconversion, and allows more flexible production of finished products specified by the international ASTM standard.

Example 5

This example illustrates the process selectivity with respect to the chemical characteristics of various vegetable oils and animal fats that are in process with the test reactor loaded with 50% by volume of a first bed of monometallic Mo catalyst and a second bed with bimetallic catalyst NiMo defined in Table 1. Table 6 presents the test data and analysis of hydrotreated products from processing of different streams of biomass oils diluted in current diesel oil (stream G), where: Test G1 corresponds to the co-processing of a feedstock containing 20 wt % of soybean oil, the G2 test for co-processing of a feedstock containing 20 wt % of palm oil, and the G3 test for co-processing of a feedstock containing 20 wt % of animal fat.

TABLE 6

|  | Test G | Test G1 | Test G2 | Test G3 |
|---|---|---|---|---|
| HDT conditions | | | | |
| Pressure, MPa | 6.1 | 6.1 | 6.1 | 6.1 |
| Temperature, ° C. | 330 | 350 | 350 | 350 |
| LHSV, h$^{-1}$ | 1.6 | 1.5 | 1.6 | 1.7 |
| H$_2$/Feedstock, Nm$^3$/m$^3$ | 539 | 632 | 589 | 557 |
| Products/Properties | Diesel | G | G1 | G2 | G3 |
| Density @ 20/4° C. | 0.8793 | 0.8733 | 0.8589 | 0.8574 | 0.8548 |
| Distillation ASTM D-2887 | | | | | |
| PIE, ° C. | 158.1 | 170.8 | 154.8 | 170.4 | 184.3 |
| 2% | 196.0 | 199.8 | 187.2 | 200.9 | 213.1 |
| 10% | 250.5 | 248.4 | 246.4 | 250.2 | 255.4 |
| 50% | 35.4 | 305.4 | 322.0 | 315.3 | 320.4 |
| 90% | 415.9 | 412.6 | 423.3 | 402.8 | 407.6 |
| 98% | 456.6 | 454.0 | 452.5 | 448.6 | 454.0 |
| PFE | 482.0 | 480.3 | 492.8 | 477.3 | 486.6 |
| S, mg/kg | 4163 | 541 | 204 | 207 | 119 |
| N, mg/kg | 708 | 595 | 203 | 349 | 380 |
| DCN | 47.8 | 48.6 | 57.4 | 56 | 57 |

TABLE 6-continued

|  | Test G | Test G1 | Test G2 | Test G3 |
|---|---|---|---|---|
| n-parafins, % m/m |  |  |  |  |
| nC15 | 1.9 | 1.9 | 1.9 | 2.1 | 2.3 |
| nC16 | 1.7 | 1.7 | 3.0 | 8.1 | 7.1 |
| nC17 | 1.8 | 1.8 | 2.2 | 2.3 | 2.9 |
| nC18 | 1.3 | 1.4 | 6.9 | 10.1 | 12.8 |

Comparatively, the distillation curves of G and the other products shown in Table 6 are similar, keeping the final boiling point (FBP), which indicates that the biomass oils were converted into hydrotreated product.

It is also observed that regardless of the origin of the biomass oils, there was significant increase of the ignition quality and increased content of n-paraffins with an even number of carbon atoms, indicating that the dehydration reactions are favoured by the combination of two combined beds catalysts, without compromising the catalytic activity for the conversion of sulfur.

Superior results would also be expected in EXAMPLES 1-5 if W, for example, was used as the VIB metal of the first catalytic bed.

Therefore, the co-processing of biomass oil diluted in a refinery stream in a HDT unit, with a selective first monometallic catalyst constituted by a group VIB metal oxide followed by at least one conventional bimetallic catalyst for a HDT unit, can be used in the co-processing of triglycerides diluted with a stream of diesel oil, and advantageously has high selectivity for production of n-paraffins of even number of carbon atoms.

The present invention is susceptible to various modifications and alternative means, and specific examples thereof have been shown by way of example as described in detail. It should be understood, however, that the present invention is not to be limited to the particular devices or methods disclosed, but to the contrary, the present invention is to cover all modifications, equivalents, and alternatives falling within the spirit and scope of the claims.

What is claimed is:

1. A process for hydrotreating biomass oil diluted in a refinery stream of petroleum hydrocarbons, the process comprising processing the biomass oil diluted in a refinery stream of petroleum hydrocarbons in the sulphided catalytic beds consisting
of (i) a first monometallic catalytic bed containing only one VIB metal oxide and (ii) at least one second bimetallic catalytic bed for hydrotreating the refinery stream, the process comprising the steps of:
(a) diluting a volume of biomass oil comprising more than 70% by wt of one or more triglycerides and/or one ore more fatty acids in a refinery stream of petroleum hydrocarbons with a distillation range between 140 and 500° C. to obtain a feedstock containing between 1 and 75% by wt of the biomass oil;
(b) mixing a hydrogen stream with the feedstock to obtain a first reaction mixture, which is heated and injected in the first catalytic bed at a temperature of between 220 and 370° C., causing it to react under a pressure of between 3 and 15 MPa;
(c) injecting upstream of a second catalytic bed a dilution stream comprising hydrogen to obtain a second reaction mixture, which is hydrotreated under conditions for hydrotreating petroleum hydrocarbons, such that gaseous products and a stream of liquid hydrocarbons are obtained; and
(d) separating the gaseous products, recovering a stream of liquid hydrocarbons containing dissolved gases, and purifying the stream to remove dissolved gases to obtain a hydrotreated liquid product.

2. The process according to claim 1, wherein the biomass oil consists substantially of triglycerides and/or fatty acids with saturated carbon chains.

3. The process according to claim 1, wherein the biomass oil consists of vegetable oils, algae oils or animal fat lipids or a mixture of these in any proportions.

4. The process according to claim 3, wherein the vegetable oil is selected from the group consisting of soya oil, Barbados nut oil, castor oil, cottonseed oil, Brazilian palm tree oil, pine oil, sunflower oil, Barbados nut oil, palm oil, coconut oil, rapeseed oil, peanut oil and a mixture thereof in any proportions.

5. The process according to claim 1, wherein the first monometallic catalytic bed contains only one group VIB metal element, in oxide form, in a total concentration of between 1 and 25% by mass in relation to a support consisting of meso and macro porosity material.

6. The process according to claim 1, wherein the first catalytic bed contains the element Mo.

7. The process according to claim 1, wherein the first catalytic bed contains the element W.

8. The process according to claim 5, wherein the support is selected from alumina, silica, silica/alumina, magnesium oxide and carbon.

9. The process according to claim 1, wherein the first catalytic bed is charged in the first fixed bed of a reactor of an HDT unit.

10. The process according to claim 1, wherein the first catalytic bed is charged in a pre-reactor of an HDT unit.

11. The process according to claim 1, wherein the at least one second catalytic bed for hydrotreating consists of a bimetallic catalyst capable of promoting the hydrogenation reactions of unsaturated hydrocarbon and removal of the heteroatomic components from the refinery stream of petroleum hydrocarbons.

12. The process according to claim 11, wherein the bimetallic catalyst consists of group VIB metal oxide promoted by elements from group VIII in a support consisting of meso and macro porosity material.

13. The process according to claim 12, wherein the VIB metal elements are selected from Mo and W and the elements from group VIII are selected from element Ni and Co, dispersed in a concentration of between 1 and 25% by mass of the support.

14. The process according to claim 13, wherein the support is selected from alumina, silica, silica/alumina and magnesium oxide, and wherein the hydrogen stream has a concentration of more than 90% by volume.

15. The process according to claim 1, wherein the hydrogen stream includes a recycle stream from the gaseous products of the process.

16. The process according to claim 1, wherein the dilution stream includes a recycle stream from the gaseous products of the process.

17. The process according to claim 1, wherein the concentration of hydrogen is adjusted upstream of each catalytic bed subsequent to the first.

18. The process according to claim 17, wherein the concentration of hydrogen in the dilution stream is adjusted to replenish hydrogen consumed from the first reaction mixture upstream of each catalytic bed subsequent to the first.

19. The process according to claim 1, wherein the one or more triglycerides have ester groups derived from fatty acids having a C12-C18 carbon chain and/or the one or more fatty acids have a C12-C18 carbon chain.

20. The process according to claim 1, wherein the process provides a first reaction zone for hydroconversion of the triglycerides and/or fatty acids into corresponding n-paraffins C12-C18.

* * * * *